United States Patent [19]
van Kampen

[11] 4,117,269
[45] Sep. 26, 1978

[54] TIME DIVISION MULTIPLEX TELECOMMUNICATION EXCHANGE

[75] Inventor: Hans van Kampen, Hilversum, Netherlands

[73] Assignee: U.S. Philips Corporation, New York, N.Y.

[21] Appl. No.: 608,391

[22] Filed: Aug. 27, 1975

[30] Foreign Application Priority Data

Sep. 11, 1974 [NL] Netherlands .......................... 7412053

[51] Int. Cl.² .............................................. H04J 3/16
[52] U.S. Cl. .......................... 179/15 BW; 179/15 AT
[58] Field of Search ....... 179/15 BW, 15 AT, 15 AQ, 179/15 AL; 340/172.5

[56] References Cited

U.S. PATENT DOCUMENTS

| | | |
|---|---|---|
| 3,458,659 | 7/1969 | Sternung .......................... 179/15 AQ |
| 3,588,364 | 6/1971 | Wallingford .................... 179/15 BW |
| 3,749,845 | 7/1973 | Fraser ............................... 179/15 AL |
| 3,794,981 | 2/1974 | O'Connor ......................... 340/172.5 |
| 3,811,014 | 5/1974 | Seitz ................................. 179/15 BW |
| 3,851,106 | 11/1974 | Jacobaeus ......................... 179/15 BW |
| 3,927,268 | 12/1975 | Sciulli ............................... 179/15 BW |

*Primary Examiner*—David L. Stewart
*Attorney, Agent, or Firm*—Frank R. Trifari; Simon L. Cohen

[57] ABSTRACT

Time division multiplex telecommunication exchange in which each bit group received is compared, in the incoming line circuits, with the preceding bit group. When two successive bit groups are equal, the second group is not supplied to the switching device which serves for the exchange of data between the connected transmission lines. The outgoing line circuits retransmit the bit group when no new bit group is received from the switching device within a predetermined time.

1 Claim, 2 Drawing Figures

TIME DIVISION MULTIPLEX TELECOMMUNICATION EXCHANGE

BACKGROUND OF THE INVENTION (1) Field of the Invention

The invention relates to a time division multiplex telecommunication exchange, comprising a number of line circuits to which incoming and outgoing transmission channels are connected, which transmission channels are arranged for the transmission of bit stream, which are divided into bit groups, and in which a switching device is available for the transmission in time division multiplex of bit groups from the line circuits of the incoming transmission channels to the line circuits of the outgoing transmission channels through a common bus line.

The invention relates in particular to data switching exchanges for the selective exchange of data between connected transmission lines. The data signals may be isochronous binary signals or also asynchronous start-stop telegraph signals.

(2) Description of the State of the Art

Data switching exchanges are known in which all data which are exchanged between the connected transmission lines are transmitted through a central bus line, which is accessible in time division multiplex to all line circuits. An example of such a data switching exchange is described in French patent specification No. 2,119,417.

In the line circuits of the incoming transmission lines the data bits are collected in bit groups. A bit group which must be transferred from an incoming transmission line to an outgoing transmission line passes the central bus line in a time slot which is much smaller than the time slot occupied by the bit group on the transmission line. In this way, many bit groups can be transferred through the central bus line within the duration of a time slot on a transmission line.

The number of time slots on the central bus can be chosen equal to the number of incoming transmission lines, in which case each incoming transmission line may have its own time slot on the bus. In this case no blocking can occur.

When the number of connected transmission lines is great, the duration of the time slots in the bus is very short. The maximum obtainable switching speed of the electronic circuits then puts a natural limit to the number of transmission lines that can be connected. This number can only be increased if a certain possibility of blocking is accepted. In subscriber systems in which the traffic per subscriber is low and where the traffic is of a probability character, it is possible to reduce the number of time slots on the bus with respect to a number of subscriber's lines.

The ratio between the number of connected subscribers' lines and the number of time slots is the concentration factor. In telephone systems for normal subscribers, this factor is of the order of 10 for the first concentration stage. There is then, however, a certain probability that the subscriber cannot get a connection. In view of the probability character of subscriber traffic, big concentration factors can be effected for a given maximum possibility of blocking.

In the case of transmission lines carrying the traffic of a group of subscribers, it depends on the traffic capacity, which can be roughly defined as the percentage of the time the line is occupied by traffic in a busy hour, in how far a still further concentration can be effected.

Time division multiplex data switching exchanges with concentration can be distinguished in a type, in which a particular time slot is associated with each connection, and in a type with so-called addressed time division multiplex, in which any arbitrary time slot is made available for the transfer of each bit group. In the latter case each bit group can be provided with a destination address, which indicates to which outgoing transmission line the bit group must be transferred.

SUMMARY OF THE INVENTION

The invention has for its object to increase the number of transmission lines which can be connected to a data switching exchange, without increasing the probability of blocking or, what amounts to the same thing, to use a smaller number of time slots on the central bus for a given number of connected transmission lines.

The telecommunication exchange according to the invention is characterized in that the line circuits for the incoming transmission channels comprise a comparator to compare each bit group received with the preceding bit group and means to prevent that the bit groups are supplied to the switching device when the comparator detects equality, and in that the line circuits for the outgoing transmission channels comprise means for the retransmission of a bit group when no new bit group has been received from the switching device within a predetermined time.

It has been found in actual practice that, over data and telegraph connections much so-called "idle" information is repeatedly transmitted, such as space signs, synchronization patterns, fillers and other repeatedly recurring bit groups. A well known example are the signals α and β in ARQ telegraph systems. The share of these bit groups in the total traffic may even be in the vicinity of 50%.

If, in accordance with the present invention, these bit groups are not supplied to the switching device of the data switching exchange, the central bus is loaded to a much lesser degree and when the load remains equal more transmission lines can be connected.

SHORT DESCRIPTION OF THE FIGURES

Figure 1:
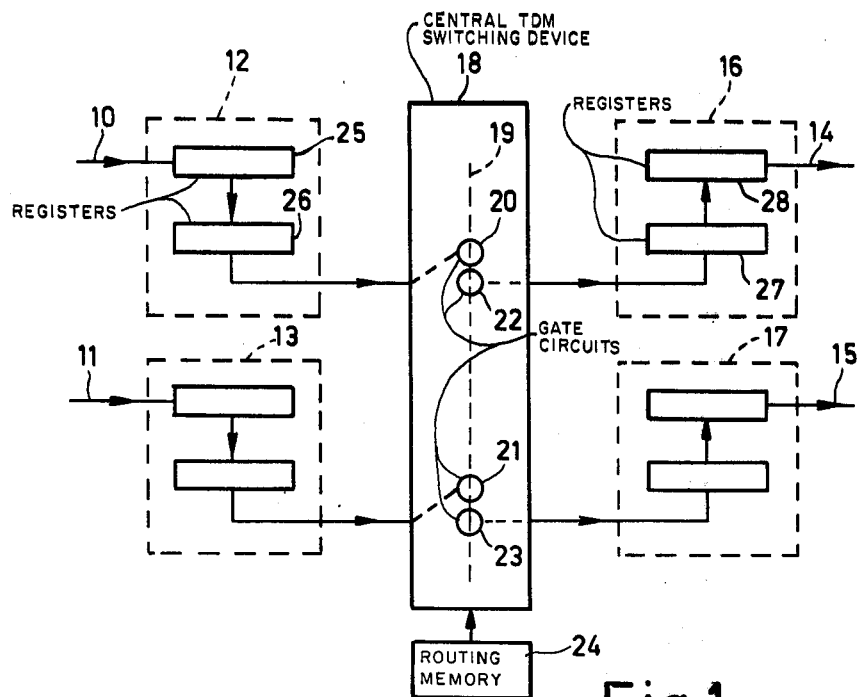
FIG. 1 shows a diagram of a known data switching exchange.

In FIG. 1, 10 and 11 designate incoming transmission lines which terminate in the incoming line circuits 12 and 13. From these transmission lines bit streams are received which are divided in bit groups in the line circuits. The time which is occupied by a bit group on a transmission line, is called a linetime slot. 14 and 15 designate outgoing transmission lines which originate from outgoing line circuits 16 and 17. These line circuits transmit bit streams to the outgoing transmission lines, which bit streams have been divided into bit groups in the line circuits.

A central time division multiplex switching device is indicated by 18. This device comprises bus 19, which is represented by a dashed line, and gate circuits 20, 21, 22, 23, which circuits have the function of connecting line circuits 12, 13, 14, 15 to the bus. On the bus the time is divided in time slots which are each of a much shorter duration than a line time slot. The time slots of the bus are called internal time slots.

A routing memory in which the data of the connections have been stored is designated by 24. This memory contains the information, which incoming transmission line is connected to which outgoing transmission line. It is assumed that each transmission line represents one information channel, although the principle is not changed when the signals of various information channels are transferred through a transmission line in time division multiplex. In the latter case the routing memory contains the information, which incoming information channel is connected to which outgoing information channel.

Each incoming line circuit (12 is described here) comprises a register 25 for the composition of bit groups of, for example, 8 bits. Furthermore, there is a register 26 to which the bit groups are supplied after composition.

Each outgoing line circuit (16 is described here) comprises a register 28, which performs the reverse of the operation of register 23, i.e. register 28 receives bit groups, whose bits are transmitted bit by bit to the transmission line. Furthermore, there is a register 27 which receives the bit groups of switching device 18.

A connection between an incoming transmission line (10 is chosen here) and an outgoing transmission line (14 is chosen here) is made as follows. When register 25 of line circuit 12 has composed a bit group it transfers this bit group to register 26. The presence of the bit group in register 26 is indicated and from the routing memory 24 the information is fetched what the destination (in this case transmission line 14) of the bit group is. A free internal time slot is now allocated and then the bit group of register 26 with the destination address is fed to bus 19 in this time slot.

The outgoing line circuits examine the destination address to see whether the bit group is destined for them. The outgoing line circuit which matches the destination address (in this case line circuit 16) accepts the bit group of the bus and stores it in register 27.

Thereafter, register 27 transfers the bit group to register 28, which transmits the bit group, bit by bit, to transmission line 14.

Figure 2:
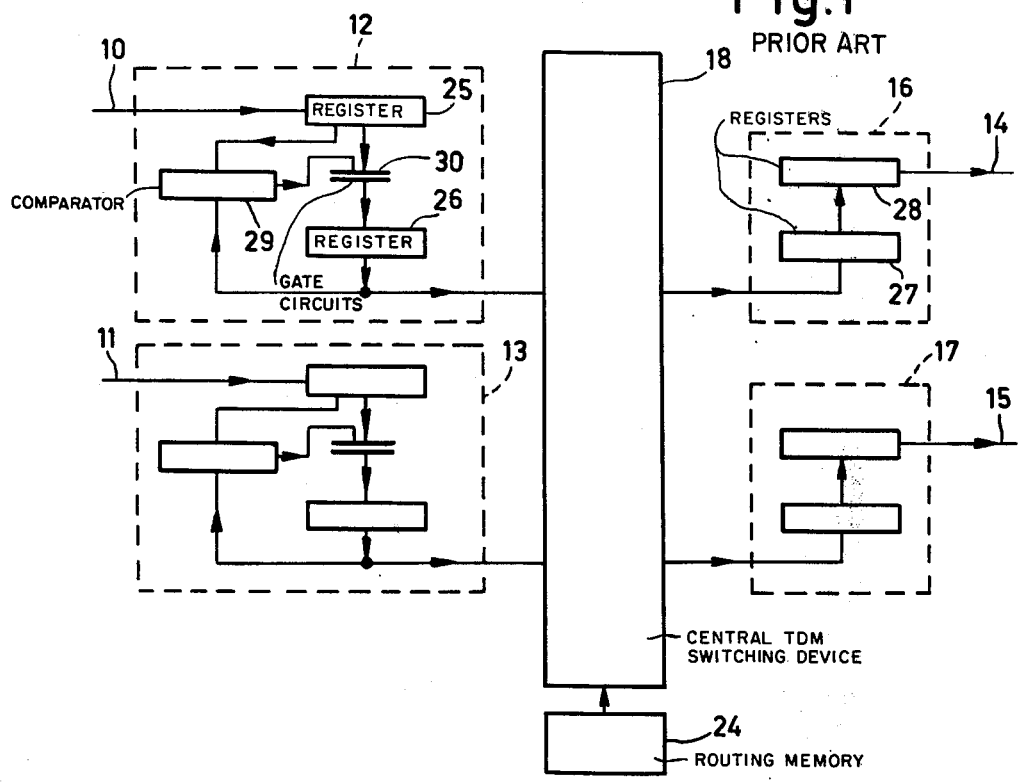
FIG. 2 shows a diagram of a data switching exchange according to the invention.

In FIG. 2 the same references have been used for the parts which correspond to the parts of FIG. 1.

In the data switching exchange according to FIG. 2, each incoming line circuit (12 is described here) is provided with a comparator 29 which controls a gate circuit 30. Comparator 29 compares a bit group which has been stored in register 26 with the bit group which has been composed in register 25. If these bit groups prove to be equal, comparator 29 inhibits, by means of gate circuit 30, the transfer of the bit group from register 25 to register 26. The signal that a new bit group has been received is not delivered and no free internal time slot need be made available for the transfer of the bit group.

Each outgoing line circuit has been arranged in such a way that a bit group is again transmitted when no new bit group has been received from the switching device within a predetermined time. This guarantees the continuity of the transmitted bit streams and this bit stream is identical with the one which is received from the relevant incoming transmission line. This can be effected in a simple manner by nondestructive read-out of the bit group which is stored in register 27, when the bit group is transferred to register 28. The same bit group can then be transferred to register 28 as often as necessary, although extra measures are required then at the termination of a connection, but these cause no problems and are outside the scope of the present patent application.

The bit groups into which the bit stream received can be divided, may be the same as the bit groups which are transmitted by the subscriber. In time division multiplex transmission with bit group interleaving it is preferred, that the incoming line circuits divide the bit stream into the same bit groups as already present in the multiplex structure.

It is finally observed that, besides for isochronous data signals, the invention can also be used in principle for start-stop telegraph signals, albeit that in the latter case there is a possibility (offered by the standardization in this field) to detect special signals and to prevent their exchange in this way.

What is claimed is:

1. Time division multiplex telecommunication exchange, of the type comprising a number of line circuits to which incoming and outgoing transmission channels are connected, which transmission channels are arranged for the transmission of bit streams divided into bit groups, switching means connected to each transmission channel for the transmission in time division multiplex of bit groups from selected line circuits of the incoming transmission channels to selected line circuits of the outgoing transmission channels, a common bus line on which said bit groups are conducted through said switching means, the improvement wherein each of the line circuits for the incoming transmission channels comprises a separate comparator means for comparing each bit group received with the preceding bit group and gate means responsive to said comparator means for preventing a bit group from being supplied to the switching means when the comparator detects equality, said switching means selecting and allocating a free time division multiplex time slot only in response to the passage of a bit group through said gate means and wherein the line circuits for the outgoing transmission channels comprise means for the retransmission of a bit group when no new bit group has been received from the switching means within a predetermined time.

* * * * *